United States Patent
Bailey et al.

(10) Patent No.: US 8,332,084 B1
(45) Date of Patent: Dec. 11, 2012

(54) FOUR-DIMENSIONAL WEATHER PREDICTOR BASED ON AIRCRAFT TRAJECTORY

(75) Inventors: Louis J. Bailey, Kent, WA (US); Gregory T. Saccone, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 560 days.

(21) Appl. No.: 12/490,290

(22) Filed: Jun. 23, 2009

(51) Int. Cl.
*G05D 3/00* (2006.01)
*G06F 7/00* (2006.01)
*G06F 17/00* (2006.01)
*G01C 23/00* (2006.01)

(52) U.S. Cl. .................. 701/10; 701/3; 701/4; 701/14; 701/415

(58) Field of Classification Search ................. None
See application file for complete search history.

(56) References Cited

U.S. PATENT DOCUMENTS

| | | | | |
|---|---|---|---|---|
| 5,051,910 A | * | 9/1991 | Liden | 701/204 |
| 5,574,647 A | * | 11/1996 | Liden | 701/8 |
| 6,134,500 A | * | 10/2000 | Tang et al. | 701/202 |
| 6,266,610 B1 | * | 7/2001 | Schultz et al. | 701/201 |
| 6,501,392 B2 | | 12/2002 | Gremmert et al. | |
| 6,600,991 B1 | * | 7/2003 | Jardin | 701/206 |
| 6,819,983 B1 | * | 11/2004 | McGraw | 701/4 |
| 6,937,937 B1 | | 8/2005 | Manfred et al. | |
| 7,925,393 B2 | * | 4/2011 | Bolt et al. | 701/10 |
| 7,945,355 B2 | * | 5/2011 | Akalinli et al. | 701/14 |
| 2007/0162234 A1 | * | 7/2007 | Root et al. | 702/3 |
| 2009/0012663 A1 | * | 1/2009 | Mead et al. | 701/14 |

OTHER PUBLICATIONS

NOAA Satellite and Information Service; World's Largest Archive of Climate Data; National Climatic Data Center; Protecting the Past, Revealing the Future; Nov. 10, 2008; http://www.ncdc.noaa.gov/oa/ncdc.html.

* cited by examiner

*Primary Examiner* — Khoi Tran
*Assistant Examiner* — Bao Long T Nguyen
(74) *Attorney, Agent, or Firm* — Klintworth & Rozenblat IP LLC

(57) ABSTRACT

A method of determining environmental data along a trajectory of an aircraft may assist in the evaluation of flight conditions along the trajectory. Environmental data may be at least one of collected, derived, and fused from a plurality of weather sources using at least one processor. The environmental data may be filtered, extrapolated, and fused, using the at least one processor, within at least one selected volume of airspace over a trajectory of the aircraft based on selected weather-applicability time intervals, and on at least one of user-selected parameters and weighted environmental data criteria. The trajectory may comprise at least one of a planned trajectory, a current trajectory, and an intent trajectory of the aircraft. An effect of the filtered, extrapolated, and fused environmental data on the trajectory may be determined using the at least one processor.

28 Claims, 6 Drawing Sheets

FOUR-DIMENSIONAL WEATHER PREDICTOR BASED ON AIRCRAFT TRAJECTORY

FIELD OF THE DISCLOSURE

The disclosure relates to methods and apparatus for predicting weather effects based on varied weather sources on a trajectory, such as a planned trajectory, a current trajectory, and an intent trajectory, of an aircraft.

BACKGROUND OF THE DISCLOSURE

Weather information (including wind, temperature, and turbulence) is one of the key factors of advanced air traffic management (ATM) concepts. Typically, weather information is not uniformly applied to aircraft in flight. In many cases, no weather information is available, or the weather information that is available is too old to be relevant or is not in the granularity needed to allow the flight management system (FMS) to provide accurate predictions to its flight models. Typically, wind information in the vertical plane is not used in calculations. Additionally, weather data (also referred to interchangeably as environmental data throughout this disclosure) that is provided to aircraft may not pertain to route changes that aircraft experience during routine flights. Further, more beneficial trajectories (i.e. optimum trajectories) are often not calculated and offered as alternatives based on specific local time-based weather interpolations.

Weather services such as the Rapid Update Cycle (RUC) provide weather data, but this only serves as a potential source of raw data, not corrected or projected. Another system that does a projection of weather over a trajectory (NOAA's Aviation Digital Data Service application) does not perform any time projections of the flight, nor does it perform weighted interpolation, nor suggest alternate paths, nor function outside of the United States.

Current solutions for weather generally use weather from sources that apply to a large region and are updated at relatively long intervals. The weather for one segment of the flight might not be applicable to other segments. Some attempts have been made at higher-resolution, and quicker updates of weather, but those are generally only applicable to a very small area, and extrapolating to other areas may introduce inaccuracies.

Data fusion may also be currently performed, but not in a user-preferred manner that allows different smoothing and filtering techniques to be applied, nor that takes a normalized timeline into account. Moreover, the weather within the most applicable volume around the trajectory is often not analyzed in the applicable time, which may lead to inaccurate results.

Existing generic weather data solutions may not allow for one or more of the following: for users to fuse data according to preferred time intervals and preferred criteria; for time-based trajectory predictions based on specific points and for the correlation of positions/times with relevant time-based weather data; for users to apply custom filtering mechanisms and to include weighting factors to enhance predictions; for optimal trajectory recalculations based on preferred characteristics and user-defined areas on a user-configurable flight segment perspective; for the consideration of vertical wind components; and for the consideration of each of wind in four dimensions, temperature, humidity, turbulence, barometric and altitude pressure, GPS altitude, and aircraft performance characteristics.

A need exists for weather data to be one or more of the following: made relevant, at the most micro-level possible, to a specific flight's trajectory; analyzed at frequent intervals or on demand upon receipt of an external trigger for potential impacts on a specific flight's trajectory; filtered, extrapolated, and fused between minimum resolutions and across different sources; weighted according to a volume of applicability based on user-selected parameters and weighted environmental data criteria; normalized across different time segments; used to suggest more efficient trajectories; modified and made available to specific aircraft, tailored to the aircraft's trajectory; and provided in a format that gives the largest potential impact information in priority order.

SUMMARY OF THE DISCLOSURE

In one embodiment, a method of determining environmental data along a trajectory of an aircraft may be provided. In one step, environmental data may be at least one of collected, derived, and fused from a plurality of weather sources using at least one processor. In another step, the environmental data may be filtered, extrapolated, and fused, using the at least one processor, within at least one selected volume of airspace over a trajectory of the aircraft based on selected weather-applicability time intervals, and on at least one of user-selected parameters and weighted environmental data criteria. The trajectory may comprise at least one of a planned trajectory, a current trajectory, and an intent trajectory of the aircraft. In an additional step, an effect of the filtered, extrapolated, and fused environmental data on the trajectory may be determined using the at least one processor.

In another embodiment, an apparatus for predicting environmental influences on an aircraft may be provided. The apparatus may include a plurality of weather sources, at least one input device, and at least one processor. The plurality of weather sources may provide environmental data. The at least one input device may allow the inputting of user input parameters into the at least one processor. The input parameters may include at least one selected volume of airspace over a trajectory of the aircraft, and selected weather-applicability time intervals over the trajectory. The trajectory may comprise at least one of a planned trajectory, a current trajectory, and an intent trajectory of the aircraft. The at least one processor may be in communication with the plurality of weather sources. The at least one processor may include a weather data element, a configuration data element, a weather selection element, and a trajectory predictor device. The weather data element may be for extrapolating, fusing, and filtering the environmental data, based on location and time, from the plurality of weather sources. The configuration data element may be for storing the inputted user input parameters. The weather selection element may be for performing calculations on the extrapolated, fused, and filtered environmental weather data based on weighted criteria comprising at least one of the user input parameters and pre-set parameters. The weather data element, the configuration data element, and the weather selection element may communicate.

In an additional embodiment, a method of determining environmental data along a trajectory of an aircraft may be provided. In one step, environmental data may be at least one of collected, derived, and fused from a plurality of weather sources using at least one processor. In another step, the environmental data may be filtered, extrapolated, and fused, using the at least one processor, within at least one selected volume of airspace over a trajectory of the aircraft based on selected weather-applicability time intervals, and on at least one of user-selected parameters and weighted environmental data criteria. The trajectory may comprise at least one of a planned trajectory, a current trajectory, and an intent trajectory of the aircraft. In an additional step, the environmental data may be filtered, extrapolated, and fused, using the at least one processor, within at least one re-route volume of airspace over the trajectory based on the selected weather-applicability time intervals. In another step, forces on the aircraft may be calculated, using the at least one processor, over the trajectory and flight times of the aircraft based on the filtered, extrapolated, and fused environmental data within the at least one selected volume of airspace. In yet another step, forces on the aircraft may be calculated, using the at least one processor, on the aircraft over the trajectory based on the filtered, extrapolated, and fused environmental data within the at least one re-route volume of airspace. In still another step, an updated trajectory of the aircraft may be calculated, using the at least one processor, based on the calculated forces on the aircraft within the at least one selected volume of airspace. In an additional step, a determination may be made, using the at least one processor, as to whether a point within the re-route volume of airspace comprises a more optimum trajectory than the calculated updated trajectory, and the more optimum trajectory may be provided if it exists.

These and other features, aspects and advantages of the disclosure will become better understood with reference to the following drawings, description and claims.

DETAILED DESCRIPTION OF THE DISCLOSURE

Figure 1:
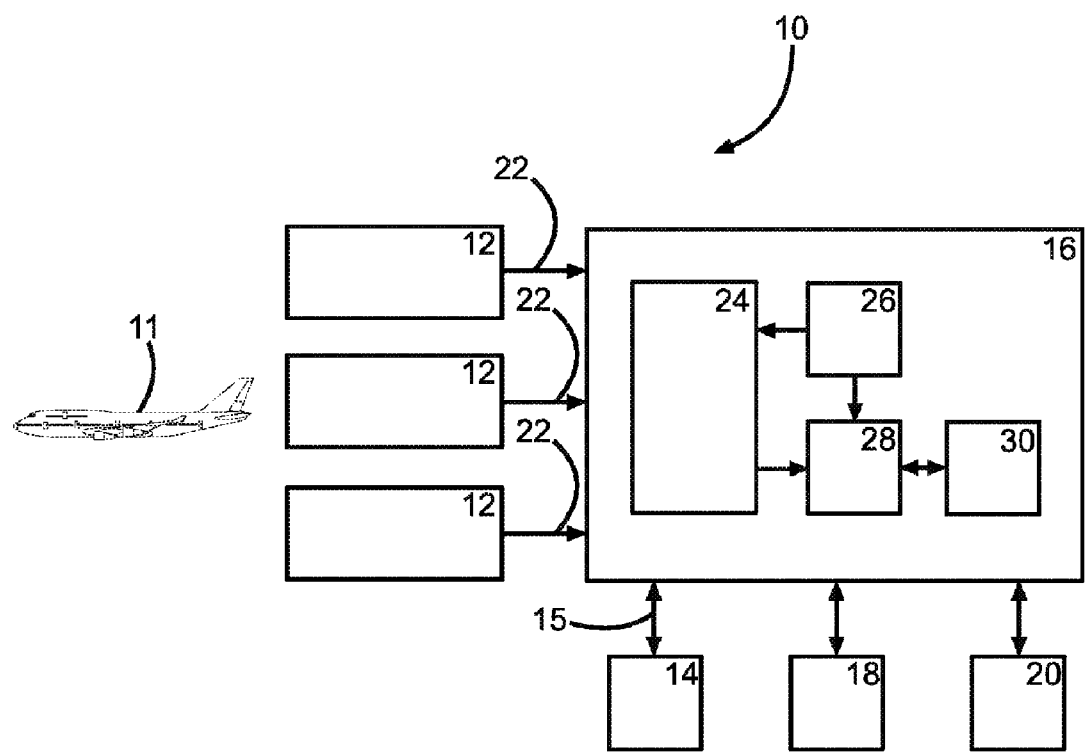
FIG. 1 illustrates one embodiment under the disclosure of a system block diagram of an apparatus for predicting environmental influences on an aircraft.

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

One or more embodiments of the disclosure may provide apparatus or methods for integrating and interpolating disparate weather information from multiple weather sources in order to determine an effect of the disparate weather information on an aircraft's trajectory, such as on a planned trajectory, on a current trajectory, and on an intent trajectory. One or more embodiments of the disclosure may further predict an updated trajectory of an aircraft, or may provide an optimized alternate trajectory. By using highly accurate 4-dimensional (4D) trajectory predictions, comprising the X, Y, and Z coordinate location of the aircraft over the aircraft's trajectory versus time, combined with multiple weather data sources (e.g. Rapid Update Cycle (RUC), Automatic Dependent Surveillance-Contract (ADS-C), Mode S, or other types of weather data sources), projecting and associating the weather sources in time, and applying smoothing techniques, a high level of accuracy in the weather data over the 4D trajectory may be obtained. This data may be manipulated by using user-input configuration preferences, by using weighted analysis, and by applying error corrected aircraft trajectory information, to determine a more accurate, updated 4D trajectory of the aircraft. The error corrected aircraft trajectory information may be continuously updated and adjusted as the flight of the aircraft progresses. This may allow for highly accurate 4D trajectory projections.

One or more embodiments of the disclosure may continuously receive and fuse weather data from various weather sources which may be normalized for a user-configurable time horizon. Another embodiment may receive and fuse weather data upon an external trigger command. Based on continually updated, specific aircraft 4D trajectory information, an extrapolated weather picture may be determined (by assigning weight and user-configurable correction factors) for particular flights over their trajectories and flight times using user-selected parameters. These user-selected parameters may include one or more selected volumes of airspace over the trajectory over selected weather-applicability time intervals, or additional user-selected parameters. In such manner, an accurate weather forecast for the aircraft's 4D trajectory may be provided taking into account the aircraft's position versus time and excluding extraneous, irrelevant weather data off the trajectory or not within the required time-intervals over the trajectory.

Specific 4D environmental data over the planned-trajectory, such as wind speed, wind direction, wind location, wind shear, temperature, turbulence, barometric pressure, atmospheric pressure, and humidity, may be determined using the user-selected parameters. Based on the determined specific 4D environmental data within the user-selected parameters, forces on the aircraft over the trajectory at particular points in time may be calculated. An updated, more accurate trajectory of the aircraft may be predicted based on the calculated forces. An alternative, more optimum trajectory than the current trajectory may also be determined. The alternative trajectory may benefit from more favorable meteorological conditions. The updated trajectory or alternate trajectory may be communicated, via one or more systems, to other aircraft, either by the airline's operational center or by an air navigation service provider (ANSP).

FIG. 1 illustrates one embodiment under the disclosure of a system block diagram of an apparatus 10 for predicting environmental influences on an aircraft 11. The apparatus 10 may include a plurality of weather sources 12, at least one input device 14, at least one processor 16, an external trajectory predictor device 18, and a clearance device 20. In other embodiments, the apparatus 10 may include varied components.

The plurality of weather sources 12 may provide environmental data 22 (also referred to interchangeably as weather data throughout this disclosure). The weather sources 12 may comprise a plurality of the following: one or more grid data sources comprising weather data based on grid location; an automatic dependent surveillance-contract (ADS-C) data source comprising weather data gathered by other aircraft; a radar data source comprising weather data derived from discrete data; a data source comprising at least one wind report; compiled historical data comprising weather data for at least one historical time; or other types of weather sources. The weather sources 12 listed are merely examples of the types of weather data sources that are available, but the disclosure is not limited to these weather data sources. The environmental data 22 may comprise wind speed, wind direction, wind location, wind shear, temperature, turbulence, barometric pressure, atmospheric pressure, humidity, or other types of environmental data.

The at least one input device 14 may be for inputting user input parameters 15 into the at least one processor 16. The input parameters 15 may comprise at least one selected volume of airspace over a trajectory of the aircraft, and selected weather-applicability time intervals (which may be measured in minutes) over the trajectory. The trajectory may comprise at least one of a planned, current, and intent trajectory of the aircraft 11. The at least one selected volume of airspace over the trajectory may comprise at least one sphere with the user entering a radius of the sphere in feet. In another embodiment, the at least one selected volume may vary in shape. The user input parameters 15 may additionally comprise one or more of the following: a trajectory intent point resolution comprising a quantity of trajectory intent points between a time-period in the selected weather-applicability time intervals (such as between the number of minutes in the weather-applicability time interval); at least one re-route volume in which the aircraft may be re-routed along an updated trajectory (this may comprise a radius of a re-route sphere measured in feet, or another varied shape re-route volume); a resolution of the at least one re-route volume comprising a quantity of re-route points to be considered in the at least one re-route volume (this may comprise a number of re-route points per feet cubed); smoothing preferences and techniques to apply (per flight segment or area volume as applicable); a type of filter to apply to predict the updated trajectory; a data fusion priority selection identifying a priority list to apply to the weather data fusion (such as airline preference, closest points to trajectory, etc.); or another type of user input parameter.

The at least one processor 16 may be in communication with the plurality of weather sources 12. The at least one processor 16 may comprise a weather data element 24, a configuration data element 26, a weather selection element 28, and a trajectory predictor device 30. The weather data element 24 may be for extrapolating, fusing, and filtering the environmental data 22, based on location and time, from the plurality of weather sources 12. The configuration data element 26 may be for storing the inputted user input parameters 15. The weather selection element 28 may be for performing calculations on the extrapolated, fused, and filtered environmental weather data 22 based on weighted criteria comprising at least one of the user input parameters 15 and pre-set parameters. The trajectory predictor device 30 may be for providing the trajectory of the aircraft 11, and for predicting an updated trajectory of the aircraft 11 based on the calculations of the weather selection element 28.

The weather data element 24, the configuration data element 26, and the weather selection element 28 may communicate. The trajectory predictor device 30 may communicate with the configuration data element 26 and at least one of the weather data element 24 and the weather selection element 28. In such manner, the at least one processor 16 may determine 4D weather data over the trajectory of the aircraft 11, may determine the forces acting on the aircraft over the trajectory based on the 4D weather data, and may predict an updated 4D trajectory of the aircraft 11 based on the forces.

The at least one processor 16 may further determine a more optimum trajectory of the aircraft based on the forces acting on the aircraft 11 over the updated 4D trajectory. This may be achieved by the weather selection element 28 performing calculations on the filtered, extrapolated, and fused environmental data 22 of the at least one re-route volume. The weather selection element 28 and the trajectory predictor device 30 may determine whether a point within the re-route volume comprises a more optimum trajectory than the predicted updated trajectory. If the point within the re-route volume comprises a more optimum trajectory than the predicted updated trajectory, the weather selection element 28 and the trajectory predictor device 30 may provide the more optimum trajectory.

The external trajectory predictor device 18 may comprise an external device for at least one of assisting in providing the trajectory of the aircraft, and for assisting in predicting an updated trajectory of the aircraft. The clearance device 20 may be for clearing an acceptability of the updated trajectory. The clearance device 20 may comprise at least one of a conflict predictor, a sequencing device, and a clearance generator.

Once the user input configuration parameters 15 are set and the processor software application of the at least one processor 16 initializes, the application may start to receive initial trajectory information for the aircraft. Additionally, environmental data (weather information) 22 may start to be received as it becomes available from the external sources 12. This weather information 22 may be applicable to the current timeframe, as well as predicted weather for the future.

Figure 2:
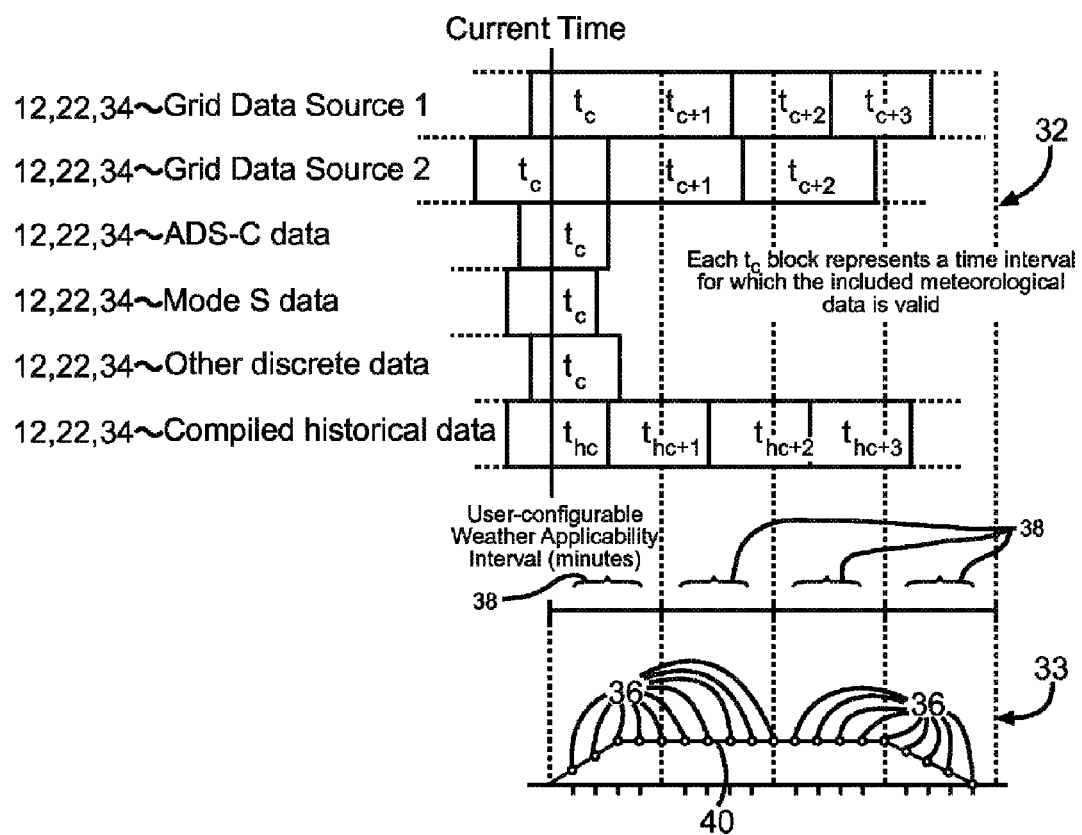
FIG. 2 illustrates one embodiment of charts showing data source trajectory-based selection for each trajectory intent point of a trajectory of an aircraft over selected weather applicability time intervals.

FIG. 2 illustrates charts 32 and 33 showing data source trajectory-based selection 34 for each trajectory intent point 36 over the selected weather applicability time intervals 38. The data source trajectory based selection 34 may comprise a calculated trajectory and may not be user selected. The selected weather applicability time intervals are time ranges either specified by the user or calculated automatically that scopes the projection in time for which the received meteorological data is applicable. This will be used for the fusion of various data sources 12, to make sure that meteorological data is not applied to a time interval for which it is not relevant, and also to allow the user to 'override' that function for when limited data is available that needs to be applied across a broad time. The trajectory intent points 36 may comprise points on the trajectory 40 that specific weather information 22 will be applied to, and for each point 36 an estimated-time-of-arrival and X, Y, Z position may be accurately estimated. The trajectory 40 may comprise at least one of a planned trajectory, a current trajectory, and an intent trajectory of the aircraft 11.

The trajectory-based selection 34 may include grid data sources (such as weather data based on grid location), automatic dependent surveillance-contract (ADS-C) data sources (such as weather data gathered by other aircraft), a radar data source comprising weather data derived from discrete data, other data sources (such as wind reports), compiled historical data sources (such as weather data for historical times), or other sources. The trajectory-based selection 34 may be compiled over the selected weather applicability time interval 38 of each trajectory intent point 36 over the trajectory 40.

Figure 3:
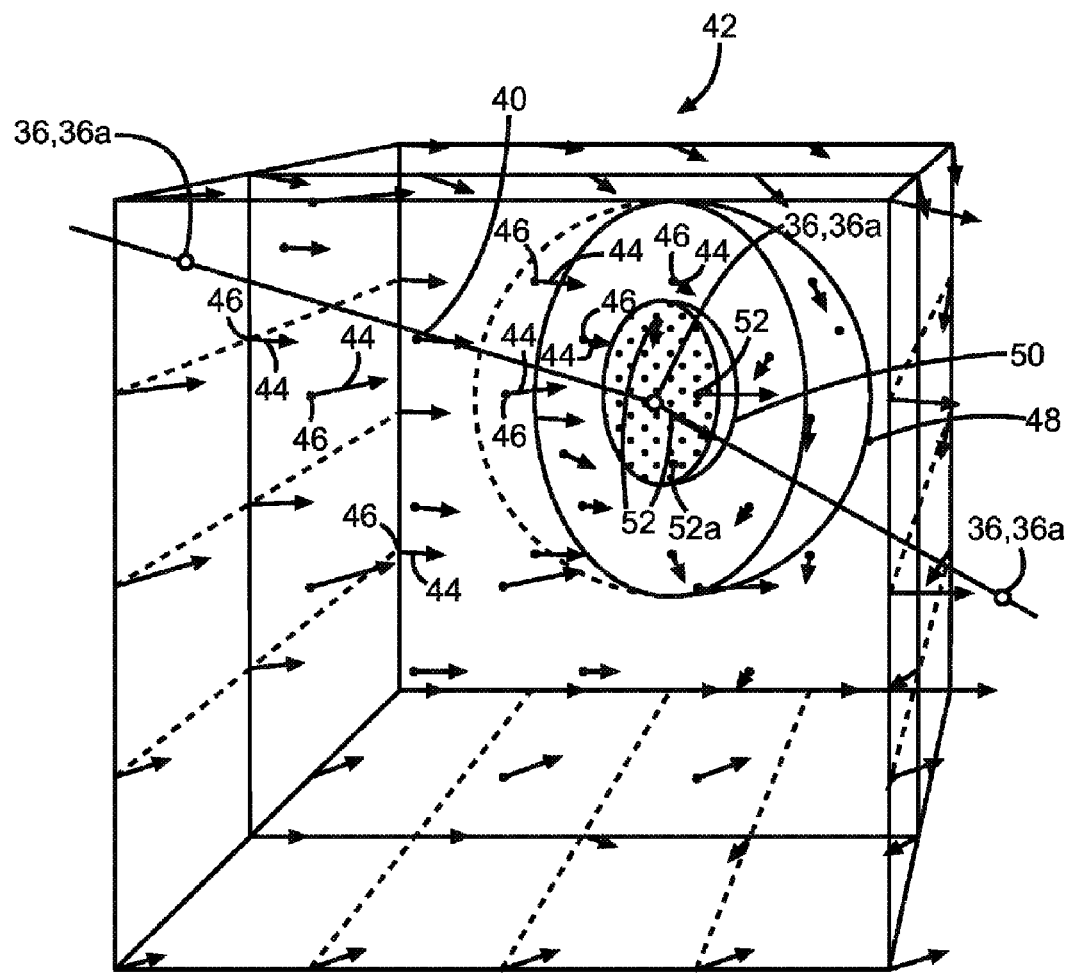
FIG. 3 illustrates one embodiment of a representative 4-dimensional weather grid for a particular section of a trajectory of an aircraft.

Once all the weather inputs 22 are received, 4D grids may be created across the airspace volume the aircraft will be traveling over during the trajectory 40 in accordance with user-input weather applicability time intervals 38. FIG. 3 illustrates a representative 4D grid 42 for a particular section of the trajectory 40. The 4D grid 42 may include wind vectors 44 and discrete weather points 46. The trajectory input from the trajectory predictor device 18 or 30 (see FIG. 1) may be applied, and the relevant sections of the trajectory 40 may be projected over each weather applicability interval 38 (see FIG. 2). This may ensure that the most relevant weather forecasts will be applied to the trajectory 40.

Starting at the beginning of the trajectory 40, the local weather impacts on each of the trajectory intent points 36 may be calculated. This may be done by evaluating all of the weather data points 46 within the at least one selected volume of airspace (in this case the user-selected sphere of applicability along the trajectory 40) 48 around or in the vicinity of each trajectory intent point 36, 090256 and performing interpolation and analysis based on the source 12 (see FIGS. 1 and 2) of the weather data 22, the type of data 22 available, and the user-inputted weighting and smoothing parameters 15 (see FIG. 1). All discrete weather points 46 within the selected volume of airspace may be evaluated using weighting and interpolation in order to determine the weather impacts of the weather points 46 on each respective trajectory intent point 36. The use of the selected volumes of airspace (volume of applicability) 48 may result in an accurate weather information estimate at each trajectory intent point 36, including such data 22 (see FIGS. 1 and 2) as wind speed and direction (including wind information in both horizontal and vertical planes), temperature, barometric pressure (depending on altitude), atmospheric pressure, and humidity.

Figure 4:
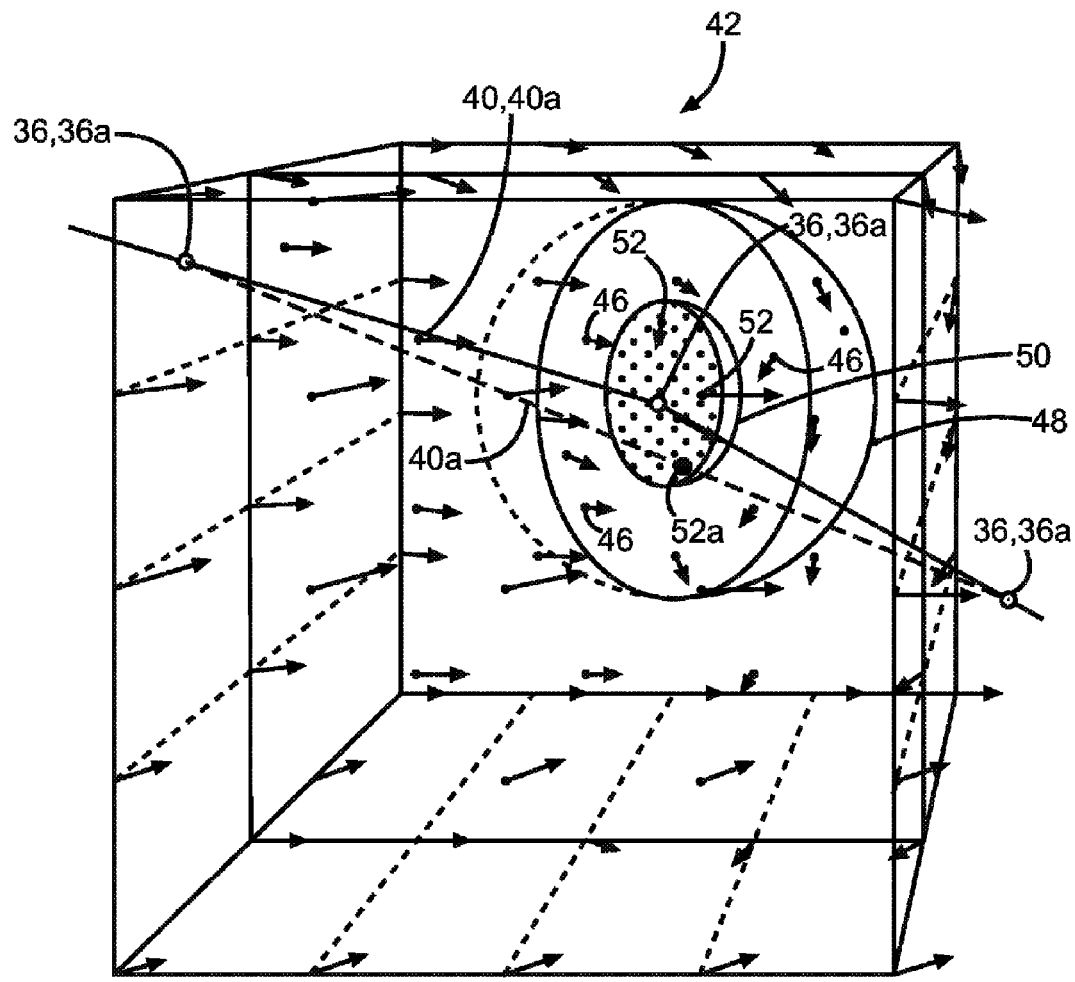
FIG. 4 illustrates one embodiment of an aircraft's trajectory being re-routed through an optimal point within a volume of re-route over the aircraft's trajectory.

As part of the interpolation process, a re-route user-selected volume (in this case the user-selected re-route sphere along the trajectory 40) 50 may be created around or in the vicinity of each trajectory intent point 36 along the trajectory 40. The re-route user-selected volume 50 may comprise additional points 52 within the volume of re-route 50 as specified by the user. The re-route volume 50 may be of equal or lesser size than the volume of applicability 48, and may comprise spheres around each trajectory intent point 36. The same smoothing process may be applied to these re-route points 52, and the total weather impacts at these points 52 may be compared with the impacts at the respective trajectory intent point 36. If the weather at one of the points 52a is more amenable to the aircraft's trajectory, and is better than a user-set threshold, the aircraft's trajectory may be changed to re-route the aircraft to that point 52a instead of the current trajectory intent point 36. FIG. 4 illustrates the aircraft's trajectory being re-routed through optimal point 52a within the volume of re-route 50. In such manner, the aircraft's trajectory may be optimized based on the weather impact calculations.

An updated 4D trajectory intent point 36a (or the optimal point 52a, depending on whether a preferred trajectory solution is recommended based on the weather impacts) may be returned along with the sum total weather effects at that point from weather data 22 (see FIGS. 1 and 2) for each trajectory intent point 36. Depending on the weather conditions, the updated 4D trajectory intent point 36a may vary in time or location from the trajectory intent point 36 of the trajectory 40. The internal trajectory predictor device 30 (see FIG. 1) may re-calculate the aircraft's trajectory 40a based on the updated 4D trajectory intent point 36a and updated weather going forward. The result may be an enhanced trajectory 40a, with specific accurate predictions at various updated trajectory intent points 36a along the trajectory 40. The updated trajectory 40a may be a more accurate representation of the intended trajectory (by location or time), or may be a different path depending on the optimizations made by selected preferred routes within the volume of re-route 50.

The updated trajectory 40a, along with the weather at the updated trajectory intent points 36a, may be made available to the external trajectory predictor device 18 (see FIG. 1), as well as to other software processes within the system that may require the data such as the clearance device 20 (e.g. conflict predictors, sequencing tools, clearance generators, etc) (see FIG. 1). The entire process may be continually repeated as the flight progresses, so that further refinements on the trajectory 40a may be made with the most up to date information. Additionally, any discrete weather inputs may be logged so that they may be used in trend analysis and input to future calculations as historical data.

One of the many advantages of one or more embodiments of the disclosure is the ability to use weather information 22 from multiple sources 12 (see FIGS. 1 and 2), as well as the ability to keep track of historical weather data. Using the user-selected configuration parameters 15 (see FIG. 1), the weather data 22 (see FIGS. 1 and 2) may be interpolated to arrive at the overall weather impact at each trajectory intent point 36. The weather data 22 (see FIGS. 1 and 2) may take into account the following information: wind location, direction, and force (in three dimensions), temperature, humidity, pressure, altitude, or other weather data. If only some of the information 22 is available from a particular source 12, then it may be used (i.e. not all of the information 22 needs to be available from all sources 12). The weather data 22 may be correlated in respect to time, and the user may specify the time interval 38 (see FIG. 2) that will be used to consider the data 22. This may be as short as the smallest time interval 38 available from one of the data sources 12, or may be longer depending on the gains of potential savings in processing power or data input versus increased weather updates and resolution.

Another advantage of one or more embodiments of the disclosure is the ability of the user to specify user-selectable configuration parameters 15 (see FIG. 1) such as the volume of applicability 48 (see FIG. 3). For instance, the user may select the radius of a sphere around each of the trajectory intent points 36. Inside the volume of applicability 48, all weather points 46 from various sources 12 (see FIGS. 1 and 2) may be used in determining the weather impacts at the trajectory intent points 36. This may be done by applying user-selectable weighting criteria.

Figure 5:
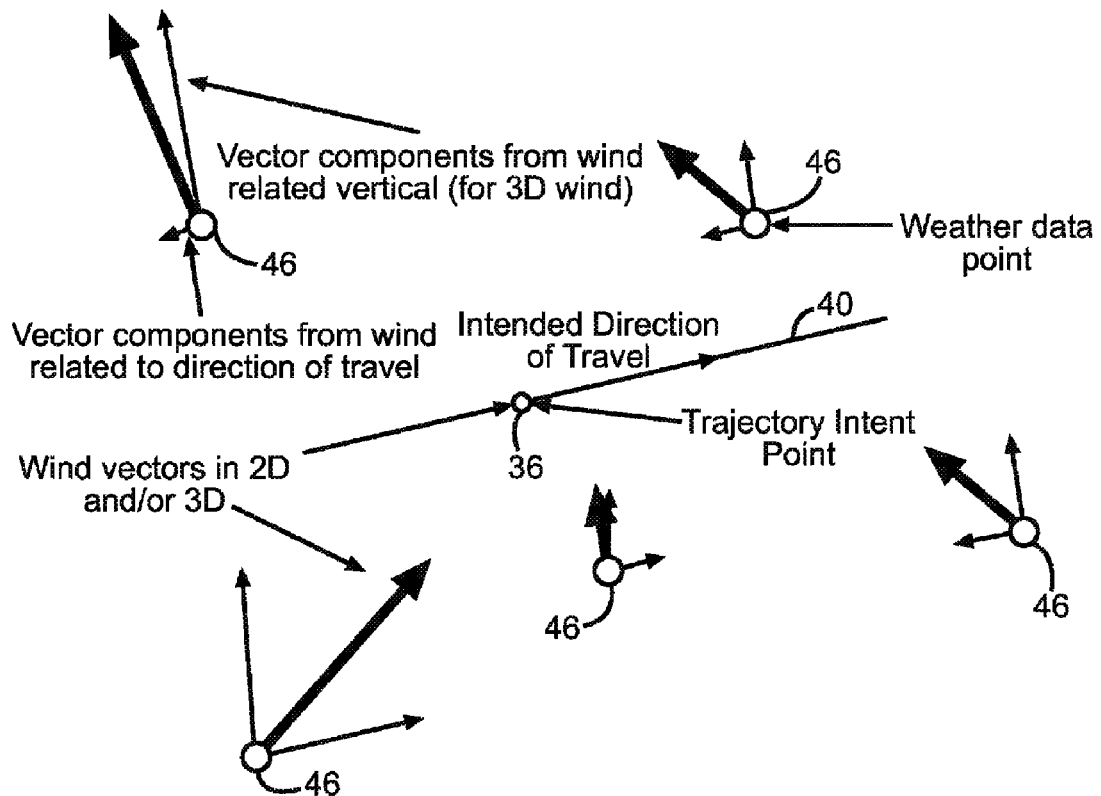
FIG. 5 illustrates a diagram showing one embodiment of varied weather components which may affect a trajectory intent point on a trajectory of an aircraft.

FIG. 5 illustrates a diagram showing one embodiment of varied weather components (points) 46 that may affect a nearby trajectory intent point 36. According to the user-selected weighting criteria, varied priority may be given to each weather component 46. For instance, higher priority may be given to points 46 that are closest to the trajectory 40, consideration may be given to the accuracy of each of the weather data 22 (see FIGS. 1 and 2), most recent information may be given priority, the most optimal profile points 46 may be given priority, historical information may be used as a result of trend analysis, the components of wind-related data that have the most affect on the trajectory may be given higher priority (e.g. the components that are directly with or against the intended direction of travel), or other user-selectable weighting criteria 15 (see FIG. 1) may be used. Additionally, aircraft performance characteristics may be taken into account when determining the impact of the weather on the aircraft's intended trajectory, as different aircraft may respond differently and may also have different capabilities.

When considering the different data points 46 within the volume of applicability 48 (see FIGS. 3 and 4), not all of the points 46 will be at or close to the trajectory intent point 36. In order to arrive at an estimated solution for the trajectory intent point 36, there may need to be an extrapolation or interpolation of the weather data 22 (see FIGS. 1 and 2) from the existing weather data points 46. The weighting factors as previously mentioned may be taken into account, but there may also need to be a data 'smoothing' function, which can be thought of as applying different filtering techniques on the data 22 in order to arrive at the most accurate estimate. This may be user-configurable, and may be a custom filter or a selection from a set of common ones (e.g. linear, exponential, Fourier, etc). Filters may also be refined as historical data and trends are studied.

Different filters may be applied for different data types (for example, a linear filter may work better for temperatures, while a customized exponential one may represent wind changes more accurately). When interpolating and extrapolating from data sources, it is recognized that differences in meteorological conditions (such as wind and temperature) between data points is not usually linear. By allowing a user to apply different filtering functions including linear, but also exponential and function-based (e.g. versions of Fourier transforms) a more accurate interpolation for the specific condition may be determined. This may also be based on the differences in "potential" of specific points, i.e. a larger difference between the weather conditions at two points separated by a specific distance may get a different filter applied than a smaller difference between two points separated by the same distance. Additional data point weighting may also be taken into account. This may include direction of flight versus wind, reduced weight for cross-components relative to direction of flight, components of vertical acceleration, proximity to trajectory and increased weight for components directly into/against direction of flight. Once the weighting and smoothing are applied to all the data points 46 in relation to the aircraft-specific parameters, a fused weather data point may be returned.

In addition, as shown in FIGS. 3 and 4, other points 52 contained in the re-route volume 50 within the volume of applicability 48 may be evaluated and compared to the impact on the trajectory 40. This re-route volume 50 may comprise the acceptable airspace volume in which the aircraft has freedom to change its route. This re-route volume may take into account factors like published airways and procedures, other traffic, and airspace constraints. Inside of the volume of re-route 50, a user-selectable number of points 52 may be evaluated to see if there are advantages to changing the aircraft's trajectory 40. If a more optimal weather point 52a for the trajectory 40 can be found within that volume 50, then that point 52a can be used, as shown in FIG. 4, to update the trajectory 40a for a better, more efficient flight.

The trajectory 40 of the flight may then be updated to an updated trajectory 40a with the internal trajectory predictor device 30 (as shown in FIG. 1). This process may repeat along the entire trajectory 40 at each specified trajectory intent point 36, and the fused weather data 22 (as shown in FIGS. 1 and 2) for each point 36 may be subsequently taken into account when updating the trajectory 40a. Alternatively, a new trajectory intent point 52a may be inserted into the trajectory 40a based on a better route alternative as calculated within the volume of re-route 50.

Figure 6:
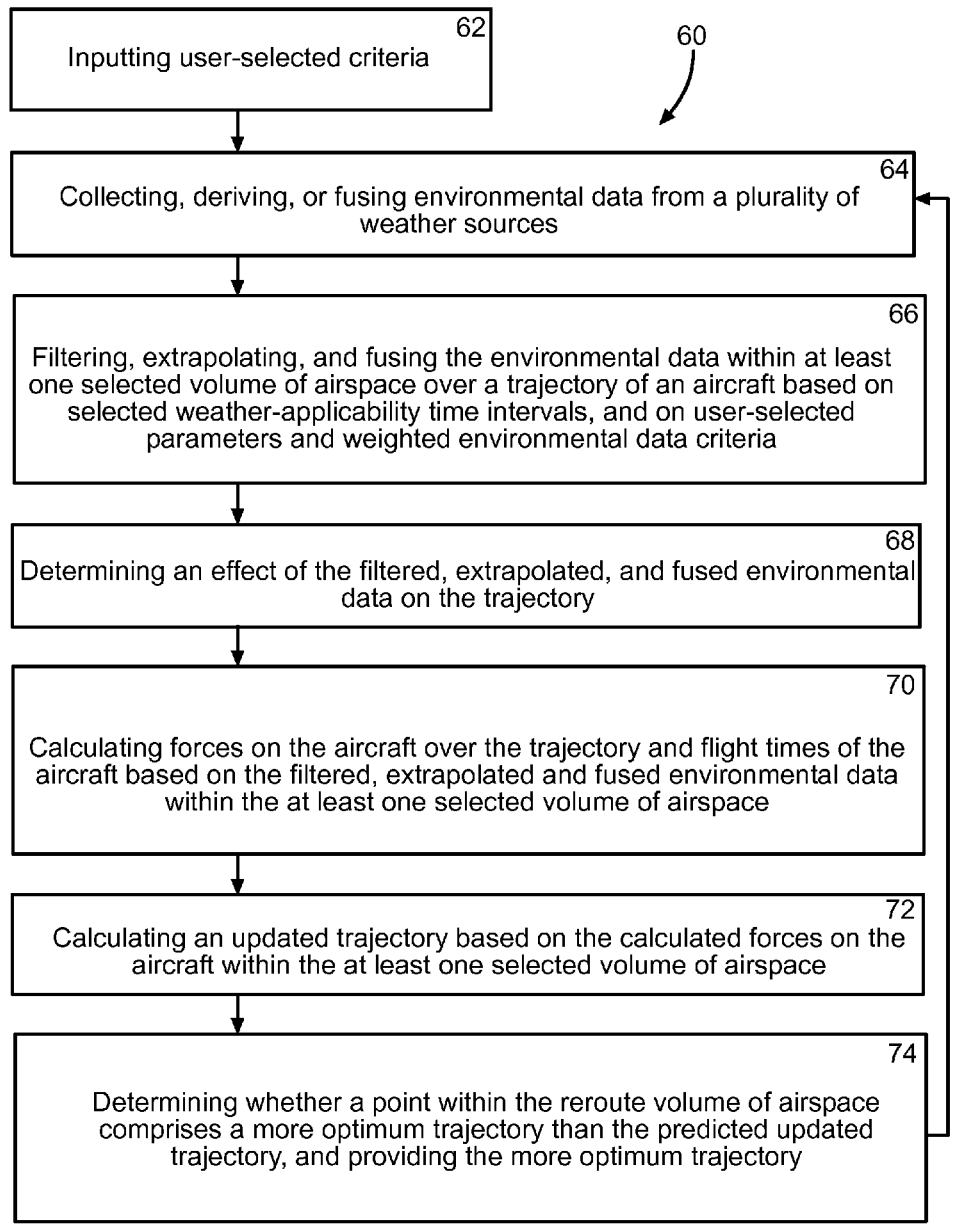
FIG. 6 illustrates a flowchart of one embodiment of a method of determining environmental data along a trajectory of an aircraft.

FIG. 6 illustrates a flowchart 60 of one embodiment of a method of determining environmental data along a trajectory of an aircraft 11. The method may be used on flights all over the world. In step 62, an user may input into the at least one processor 16 at least one of the following: the selected weather-applicability time intervals 38; a trajectory intent point resolution comprising a quantity of trajectory intent points 36 between a time-period in the selected weather-applicability time intervals 38; at least one selected volume of airspace 48; at least one re-route volume 50 in which the aircraft 11 may be re-routed along the trajectory 40; a resolution of the at least one re-route volume 50 comprising a quantity of re-route points 52 considered in the at least one re-route volume 50; a type of filter to apply; and a data fusion priority selection identifying a priority list to apply to the filtered, extrapolated, and fused environmental data 22. The at least one selected volume of airspace 48 may comprise one or more volumes centered around each trajectory intent point 36, such as a sphere around each trajectory intent point, or another type of shaped volume.

In step 64, environmental data 22 may be at least one of collected, derived, and fused from a plurality of weather sources 12 using at least one processor 16. The weather sources 12 may comprise a plurality of the following: one or more grid data sources comprising weather data based on grid location; an automatic dependent surveillance-contract (ADS-C) data source comprising weather data gathered by other aircraft; a radar data source comprising weather data derived from discrete data; a data source comprising at least one wind report; compiled historical data comprising weather data for at least one historical time; or other types of weather sources. The environmental data 22 may comprise wind speed, wind direction, wind location, wind shear, temperature, turbulence, barometric pressure, atmospheric pressure, humidity, or other types of environmental data.

In step 66, the environmental data 22 may be filtered, extrapolated, and fused using the at least one processor 16, within at least one selected volume of airspace (applicability) 48 over a trajectory 40 of the aircraft 11 based on selected weather-applicability time intervals 38, and on at least one of user-selected parameters 15 and weighted environmental data criteria. The trajectory 40 may comprise at least one of a planned trajectory, a current trajectory, and an intent trajectory of the aircraft 11. Step 66 may be done periodically or on a demand basis triggered by an external input. The at least one selected volume of airspace 48 may be centered around at least one trajectory intent point 36 along the trajectory. The at least one selected volume of airspace 48 may comprise at least one sphere.

Step 66 may comprise the at least one processor 16 interpolating and analyzing the environmental data 22 based on a type of each of the weather sources 12, and user-inputted smoothing parameters 15. The at least one processor 16 may apply at least one of a smoothing filter, a linear filter, an exponential filter, and a Fourier filter to the environmental data 22.

Step 66 may comprise filtering, extrapolating, and fusing the environmental data 22 at a plurality of trajectory intent points 36 within the at least one selected volume of airspace 48 over the trajectory 40 of the aircraft 11 based on the selected weather-applicability time intervals 38. This may occur at each of the trajectory intent points 36 over the trajectory 40. Step 66 may further comprise filtering, extrapolating, and fusing the environmental data 22 within the at least one re-route volume 50 of airspace over the trajectory 40 of the aircraft 11 based on the selected weather-applicability time intervals 38 over the trajectory 40.

In step 68, an effect of the filtered, extrapolated, and fused environmental data 22 may be determined on the trajectory 40 using the at least one processor 16. The effect of the filtered, extrapolated, and fused environmental data 22 on the trajectory 40 may be at least one of determined at regular time intervals, normalized across different time segments on the trajectory, and provided in a format that identifies the largest potential impacts on the trajectory in priority order.

In step 70, forces on the aircraft 11 may be calculated, using the at least one processor 16, over the trajectory 40 and flight times of the aircraft 11 based on the filtered, extrapolated, and fused environmental data 22 within the at least one selected volume of airspace 48. Step 70 may further comprise calculating forces on the aircraft 11, using the at least one processor 16, over the trajectory 40 based on the filtered, extrapolated and fused environmental data 22 within the at least one re-route volume 50 of airspace.

In step 72, an updated trajectory 40a of the aircraft 11 may be calculated, using the at least one processor 16, based on the calculated forces on the aircraft 11 within the at least one selected volume of airspace 48. The updated trajectory 40a may comprise predicted updated X, Y, Z coordinate locations at updated predicted times of the aircraft 11 based on the calculated forces. Step 72 may comprise predicting, for each of the plurality of trajectory intent points 36 in order one at a time, an updated trajectory flight point 36a, and using each updated trajectory flight point 36a to assist in predicting the subsequent updated trajectory flight point 36a.

In step 74, a determination may be made, using the at least one processor 16, as to whether a point 52a within the re-route volume 50 of airspace comprises a more optimum trajectory than the predicted updated trajectory (or calculated updated trajectory) 40a, and the more optimum trajectory may be provided if it exists. The re-route volume 50 may be centered around at least one trajectory intent point 36 over the trajectory 40. The re-route volume 50 may comprise one or more spheres, with each sphere centered around each trajectory intent point 36 over the trajectory 40. In other embodiments, the order of the above listed steps may change. In additional embodiments, the user may update the user-selected criteria at any point. In further embodiments, one or more of the above listed steps may be modified, deleted, or additional steps may be added.

One or more embodiments of the disclosure may optimize flight of aircraft, resulting in reduced fuel burn, saved flight time, and more predictable scheduling and operations, which may lead to reductions in flight costs. More optimal trajectories may also lead to increased capacities, which can then result in more revenue flights for air carriers.

It should be understood, of course, that the foregoing relates to exemplary embodiments of the disclosure and that modifications may be made without departing from the spirit and scope of the disclosure as set forth in the following claims.

We claim:

1. A method of determining environmental data along a trajectory of an aircraft:
at least one of collecting, deriving, or fusing environmental data from a plurality of weather sources using at least one processor;
filtering, extrapolating, and fusing the environmental data, using the at least one processor, within at least one selected volume of airspace over a trajectory of the aircraft based on selected weather-applicability time intervals and on at least one of user-selected parameters comprising user-inputted smoothing parameters or weighted environmental data criteria comprising a type of each of the weather sources, wherein the trajectory comprises at least one of a planned trajectory, a current trajectory, or an intent trajectory of the aircraft; and
determining an effect of the filtered, extrapolated, and fused environmental data on the trajectory, using the at least one processor, by calculating forces on the aircraft over the trajectory and flight times of the aircraft based on the filtered, extrapolated, and fused environmental data.

2. The method of claim 1 further comprising:
calculating an updated trajectory of the aircraft, using the at least one processor, based on the calculated forces on the aircraft.

3. The method of claim 1 wherein the effect of the filtered, extrapolated, and fused environmental data on the trajectory is at least one of determined at regular time intervals, normalized across different time segments on the trajectory, or provided in a format that identifies largest potential impacts on the trajectory in priority order.

4. The method of claim 1 wherein the environmental data comprises at least one of wind speed, wind direction, wind location, wind shear, temperature, turbulence, barometric pressure, atmospheric pressure, or humidity; and the weather sources comprise a plurality of the following: one or more grid data sources comprising weather data based on grid location; an automatic dependent surveillance-contract (ADS-C) data source comprising weather data gathered by other aircraft; a radar data source comprising weather data derived from discrete data; a data source comprising at least one wind report; or compiled historical data comprising weather data for at least one historical time-period.

5. The method of claim 1 wherein filtering, extrapolating, and fusing the environmental data comprises filtering, extrapolating, and fusing the environmental data at a plurality of trajectory intent points within the at least one selected volume of airspace over the trajectory based on the selected weather-applicability time intervals.

6. The method of claim 5 wherein filtering, extrapolating, and fusing the environmental data comprises filtering, extrapolating, and fusing the environmental data within the at least one selected volume of airspace, based on the selected weather-applicability time intervals, at each of the plurality of trajectory intent points.

7. The method of claim 1 wherein the at least one selected volume of airspace is centered around at least one trajectory intent point along the trajectory.

8. The method of claim 1 wherein filtering, extrapolating, and fusing the environmental data comprises the at least one processor interpolating and analyzing the environmental data based on the type of each of the weather sources.

9. The method of claim 1 wherein filtering, extrapolating, and fusing the environmental data comprises the at least one processor applying at least one of a smoothing filter, a linear filter, an exponential filter, or a Fourier filter to the environmental data.

10. The method of claim 1 further comprising an user inputting into the at least one processor at least one of the following: the selected weather-applicability time intervals; a trajectory intent point resolution comprising a quantity of trajectory intent points between a time-period in the selected weather-applicability time intervals; the at least one selected volume of airspace; at least one re-route volume in which the aircraft may be re-routed along the trajectory; a resolution of the at least one re-route volume comprising a quantity of re-route points considered in the at least one re-route volume; a type of filter to apply; or a data fusion priority selection identifying a priority list to apply to the filtered, extrapolated, and fused environmental data.

11. The method of claim 1 further comprising filtering, extrapolating, and fusing the environmental data within at least one re-route volume of airspace over the trajectory based on the selected weather-applicability time intervals, calculating forces on the aircraft over the trajectory based on the filtered, extrapolated, and fused environmental data within the at least one re-route volume of airspace, determining whether a point within the re-route volume of airspace comprises a more optimum trajectory than a predicted updated trajectory, and providing the more optimum trajectory if it exists.

12. The method of claim 1 wherein filtering, extrapolating, and fusing the environmental data is done periodically or on a demand basis triggered by an external input.

13. The method of claim 1 wherein filtering, extrapolating, and fusing the environmental data comprises the at least one processor interpolating and analyzing the environmental data based on the user-inputted smoothing parameters.

14. The method of claim 1 wherein filtering, extrapolating, and fusing the environmental data comprises the at least one processor interpolating and analyzing the environmental data based on the type of each of the weather sources and on the user-inputted smoothing parameters.

15. An apparatus for predicting environmental influences on an aircraft comprising:
   a plurality of weather sources for providing environmental data;
   at least one input device for inputting user input parameters into at least one processor, the input parameters comprising at least one selected volume of airspace over a trajectory of the aircraft and selected weather-applicability time intervals over the trajectory, wherein the trajectory comprises at least one of a planned trajectory, a current trajectory, or an intent trajectory of the aircraft;
   the at least one processor in communication with the plurality of weather sources, the at least one processor comprising:
      a weather data element for extrapolating, fusing, and filtering the environmental data, based on location and time, from the plurality of weather sources;
      a configuration data element for storing the inputted user input parameters; and
      a weather selection element for performing calculations on the extrapolated, fused, and filtered environmental weather data based on user-inputted smoothing parameters or on weighted criteria comprising a type of each of the weather sources;
      wherein the weather data element, the configuration data element, and the weather selection element communicate.

16. The apparatus of claim 15 further comprising a trajectory predictor device for providing the trajectory of the aircraft, and for predicting an updated trajectory of the aircraft based on the calculations of the weather selection element, wherein the trajectory predictor device communicates with the configuration data element and at least one of the weather data element or the weather selection element.

17. The apparatus of claim 15 wherein the environmental data comprises at least one of wind speed, wind direction, wind location, wind shear, temperature, turbulence, barometric pressure, atmospheric pressure, or humidity; and the weather sources comprise a plurality of the following: one or more grid data sources comprising weather data based on grid location; an automatic dependent surveillance-contract (ADS-C) data source comprising weather data gathered by other aircraft; a radar data source comprising weather data derived from discrete data; a data source comprising at least one wind report; or compiled historical data comprising weather data for at least one historical time-period.

18. The apparatus of claim 15 wherein the input parameters further comprise at least one of the following: a trajectory intent point resolution comprising a quantity of trajectory intent points between a time-period in the selected weather-applicability time intervals; at least one re-route volume in which the aircraft may be re-routed along an updated trajectory; a resolution of the at least one re-route volume comprising a quantity of re-route points considered in the at least one re-route volume; a type of filter to apply to predict the updated trajectory; or a data fusion priority selection identifying a priority list to apply.

19. The apparatus of claim 18 wherein the input parameters comprise the at least one re-route volume in which the aircraft may be re-routed along the updated trajectory, the weather selection element is further for performing calculations on the filtered, extrapolated, and fused environmental data of the at least one re-route volume, and the weather selection element and the trajectory predictor device are for determining whether a point within the re-route volume comprises a more optimum trajectory than the predicted updated trajectory, and for providing the more optimum trajectory if it exists.

20. The apparatus of claim 15 wherein the weather selection element is for performing calculations on the extrapolated, fused, and filtered environmental weather data based on the user-inputted smoothing parameters.

21. The apparatus of claim 15 wherein the weather selection element is for performing calculations on the extrapolated, fused, and filtered environmental weather data based on the weighted criteria comprising the type of each of the weather sources.

22. The apparatus of claim 15 wherein the weather selection element is for performing calculations on the extrapolated, fused, and filtered environmental weather data based on the user-inputted smoothing parameters and based on the weighted criteria comprising the type of each of the weather sources.

23. A method of determining environmental data along a trajectory of an aircraft:
   at least one of collecting, deriving, or fusing environmental data from a plurality of weather sources using at least one processor;
   filtering, extrapolating, and fusing the environmental data, using the at least one processor, within at least one selected volume of airspace over a trajectory of the aircraft based on selected weather-applicability time intervals and on at least one of user-selected parameters comprising user-inputted smoothing parameters or weighted environmental data criteria comprising a type of each of the weather sources, wherein the trajectory comprises at least one of a planned trajectory, a current trajectory, or an intent trajectory of the aircraft;
   filtering, extrapolating, and fusing the environmental data, using the at least one processor, within at least one re-route volume of airspace over the trajectory based on the selected weather-applicability time intervals;
   determining an effect on the aircraft, using the at least one processor, over the trajectory and flight times of the aircraft based on the filtered, extrapolated, and fused environmental data within the at least one selected volume of airspace;
   determining an effect on the aircraft, using the at least one processor, over the trajectory based on the filtered, extrapolated, and fused environmental data within the at least one re-route volume of airspace;
   determining an updated trajectory of the aircraft, using the at least one processor, based on the determined effect on the aircraft within the at least one selected volume of airspace; and
   determining, using the at least one processor, whether a point within the re-route volume of airspace comprises a more optimum trajectory than the determined updated trajectory, and providing the more optimum trajectory if it exists.

24. The method of claim 23 wherein filtering, extrapolating, and fusing the environmental data comprises the at least one processor interpolating and analyzing the environmental data based on the type of each of the weather sources.

25. The method of claim 23 wherein determining an effect on the aircraft comprises calculating forces on the aircraft, and determining an updated trajectory of the aircraft comprises calculating an updated trajectory of the aircraft.

26. The method of claim 23 wherein filtering, extrapolating, and fusing the environmental data comprises the at least one processor interpolating and analyzing the environmental data based on the user-inputted smoothing parameters.

27. The method of claim 23 wherein filtering, extrapolating, and fusing the environmental data comprises the at least one processor interpolating and analyzing the environmental data based on the type of each of the weather sources and on the user-inputted smoothing parameters.

28. A method of determining environmental data along a trajectory of an aircraft:

at least one of collecting, deriving, or fusing environmental data from a plurality of weather sources using at least one processor;

filtering, extrapolating, and fusing the environmental data by the at least one processor interpolating and analyzing the environmental data based on a type of each of the weather sources, and user-inputted smoothing parameters, within at least one selected volume of airspace over a trajectory of the aircraft based on selected weather-applicability time intervals and on at least one of user-selected parameters or weighted environmental data criteria, wherein the trajectory comprises at least one of a planned trajectory, a current trajectory, or an intent trajectory of the aircraft; and determining an effect of the filtered, extrapolated, and fused environmental data on the trajectory, using the at least one processor.

\* \* \* \* \*